April 17, 1934.  M. SCHNAIER  1,955,441
LIQUID FILLING AND MEASURING APPARATUS
Filed April 6, 1931  3 Sheets-Sheet 1
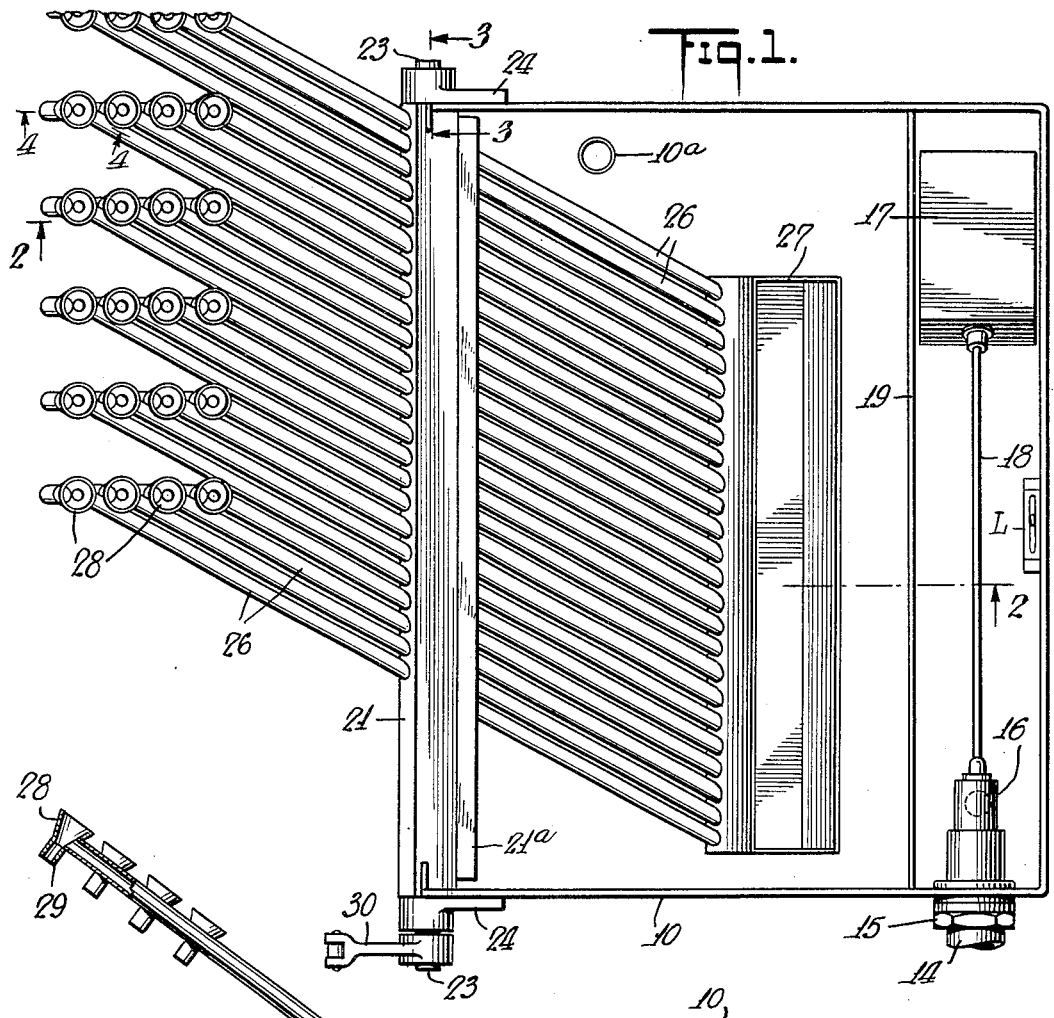
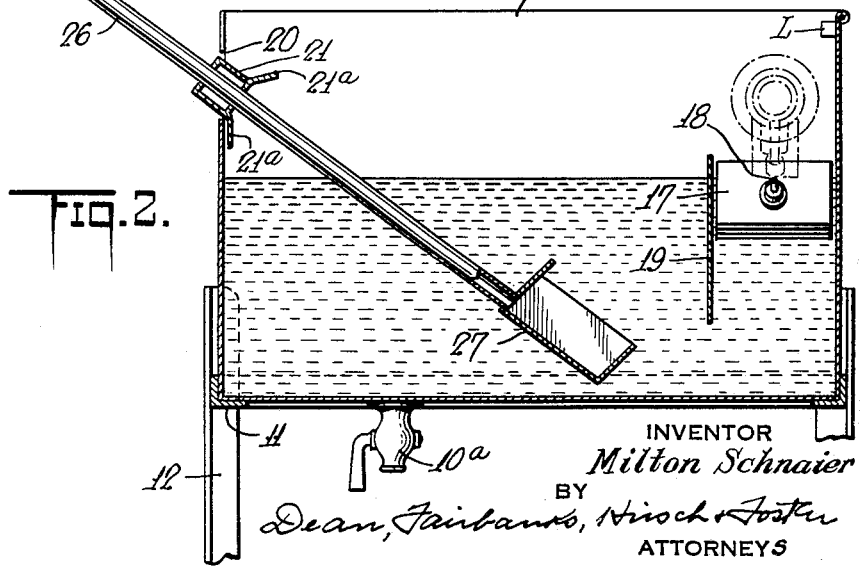
INVENTOR
*Milton Schnaier*
BY
*Dean, Fairbanks, Hirsch & Foster*
ATTORNEYS

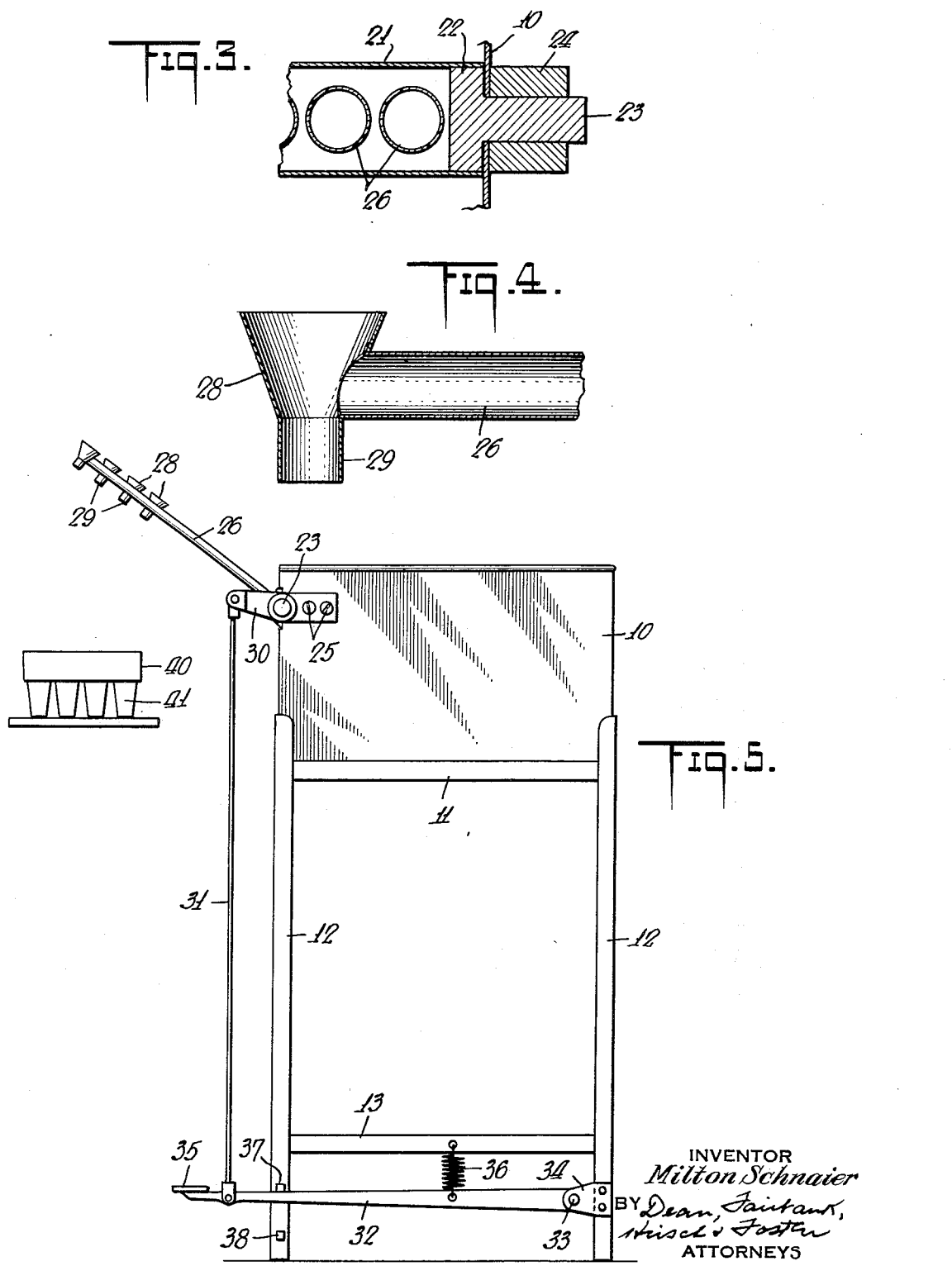

April 17, 1934.  M. SCHNAIER  1,955,441
LIQUID FILLING AND MEASURING APPARATUS
Filed April 6, 1931    3 Sheets-Sheet 3
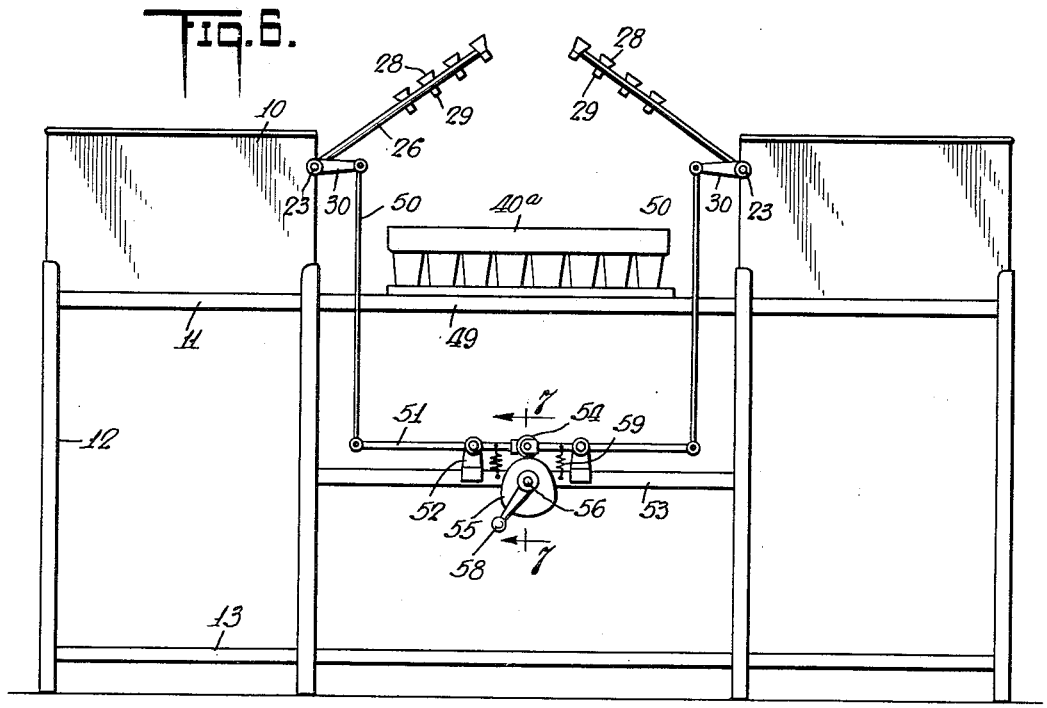
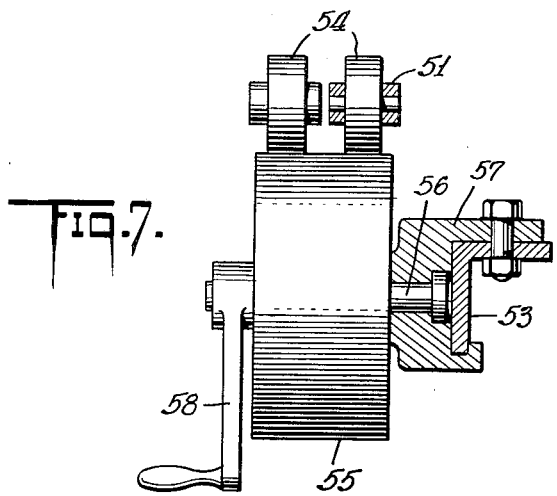
INVENTOR
*Milton Schnaier*
BY
*Dean, Fairbank, Hirsch & Foster*
ATTORNEYS Patented Apr. 17, 1934

1,955,441

UNITED STATES PATENT OFFICE 1,955,441

LIQUID FILLING AND MEASURING APPARATUS

Milton Schnaier, New York, N. Y.

Application April 6, 1931, Serial No. 527,967

17 Claims. (Cl. 226—104)

My present invention is broadly concerned with the provision of means for delivering a measured quantity of liquid from a supply tank into a receptacle.

An object of the invention is to provide apparatus of this character which is totally devoid of valve mechanism, which is highly sanitary in that it can be cleaned with expedition and facility and which, while extremely simple in construction, is capable of simultaneously depositing accurately measured amounts of liquid in a great number of receptacles.

Another object is to provide apparatus of this character, capable of ready and convenient manual or pedal manipulation, substantially foolproof in operation, rugged and durable in use and well suited to meet the requirements of economical manufacture.

Another is to provide an apparatus capable not only of feeding a row of receptacles but capable of simultaneously filling a plurality of rows of receptacles with the receptacles of each row spaced varying distances from the supply tank.

In accordance with a preferred embodiment of the invention, a relatively capacious supply tank is provided having means to automatically maintain a substantially uniform quantity of liquid therein, and to prevent in large measure, any turbulence incident to the admission of liquid to the tank.

Fixed upon a common, rockable member, mounted in, at, or adjacent the tank, are the intermediate portions of a plurality of pipes. All of these pipes are rigidly connected at one end to a common dipper member and at their other ends, the pipes are provided with discharge spouts. Preferably the construction is simplified by avoiding the use of partition members in the dipper. That is to say, when the dipper is filled with liquid and the filling unit rocked so that the contents of the dipper run down the pipes, the true horizontal plane of the dipper, the uniform cross sectional area of the pipes themselves, and their arrangement at a uniform distance above the dipper bottom, substantially guarantee correct subdivision of the total contents of the dipper, rendering the use of special partition members or other unsanitary devices, entirely unnecessary.

As suggested above, the machine is preferably capable of feeding a plurality of rows of receptacles with the receptacles of each row disposed at varying distances from the tank. With this end in view, the pipes for feeding one of such rows are of different lengths and are non-right-angularly disposed relatively to the pivotal axis, so that the outlets of a set of pipes are arranged one in advance of the other and in rows corresponding to the rows of receptacles to be filled.

Inasmuch as the use of bent pipes to provide spouts is to be avoided for sanitary reasons, the discharge elements of the pipes or tubes in the present instance, are preferably in the nature of funnels fixed to the ends of the pipes, this arrangement permitting the convenient insertion of a cleaning brush through the filling spout.

The invention may be more fully understood from the following description in connection with the accompanying drawings, wherein Fig. 1 is a top plan view of a filling and measuring apparatus embodying the invention;

Fig. 2 is a transverse sectional view therethrough, taken approximately on the staggered line 2—2 of Fig. 1;

Fig. 3 is an enlarged sectional detail on the line 3—3 of Fig. 1;

Fig. 4 is an enlarged sectional detail on the line 4—4 of Fig. 1, and

Fig. 5 is a side elevational view of the machine illustrating in dotted lines, a multiple compartment mold, adapted to be filled by the machine;

Fig. 6 is a side elevational view of a modified form of construction, and

Fig. 7 is an enlarged sectional detail on the line 7—7 of Fig. 6.

The tank 10, adapted to contain the liquid to be dispensed, may be of the generally rectangular shape shown, supported upon an angle iron frame work 11, which in turn is supported by the legs or standards 12, the legs being suitably braced at their lower ends as at 13 (Fig. 5). The supply pipe 14, for conveying liquid to the tank 10, is preferably coupled as at 15, to one side wall of the tank, near the upper rear end thereof. A float controlled valve 16 of standard construction, regulates the flow of liquid into the tank and maintains the liquid therein at a uniform level. The controlling float 17 is coupled to the valve by a float rod 18. The float and the valve are preferably of standard construction and the details thereof are not herein shown.

Extending transversely across the tank, is a baffle plate 19, which coacts with the back of the tank to separate the float structure from the forward portion of the tank. The upper edge of the plate 19 is disposed somewhat above the liquid level in the tank and the lower edge of the plate is disposed well above the bottom of the tank, to provide free communication between the liquid on opposite sides of the plate. The principal function of this plate is to prevent any turbulence at the forward end of the tank, due to the admission of liquid at the rear end thereof.

Above the liquid level in the tank, the upper forward wall thereof is cut away as at 20, to accommodate a hollow, rectangular, pipe-carrying cross bar 21, the ends of the bar 21 as best seen in Fig. 3, being closed by plates or blocks 22, carrying trunnions 23 journaled in brackets 24, secured upon the exterior of the tank 10, as by the screws 25. Extending through the hollow bar 21, are a plurality of parallel pipes 26, all connecting at their rear ends with a common dipper or trough 27. Each pipe at its outer or forward end, terminates in a funnel 28, the pipe communicating laterally with the funnel and the reduced ends of the funnels serving to present downwardly directed discharge spouts 29.

It will be apparent that when the bar 21 is rocked in one direction, the dipper 27 will be submerged in the liquid of the tank and as the bar is rocked in the opposite direction, the dipper with its charge of liquid, will rise above the liquid level and upon further rocking of the bar, the contents of the dipper will flow through the various pipes 26 and be delivered through the spouts 29.

Contrary to prior practice, wherein the use has been made of dippers divided into measuring compartments, I simplify the construction and render it far more sanitary by avoiding the use of dipper compartments, since, inasmuch as the cross sectional areas of the pipes 26 are all equal and such pipes join the dipper at the same distance above its bottom, the dipper is originally set and always maintained in a true horizontal plane, the uniform pipe sizes themselves insure substantially equal distribution of liquid from the dipper through the pipes, as the rocking structure is moved to discharging position.

It will be apparent that, as thus far described, the filling and measuring apparatus could be conveniently operated by hand in order to deliver a measured charge of liquid to a plurality of receptacles arranged in proper position to catch the delivery from the spouts 29. For convenience of operation, however, I have shown a crank arm 30, fixed upon the projecting end of one of the trunnions 23, and the free end of this crank arm is connected by a link 31, with a lever 32 pivotally connected at 33 to a bracket 34, mounted upon one of the rear standards 12. Lever 32 is provided with a treadle 35 at its forward end, a coiled contractile spring 36 connecting the intermediate portion of lever 32 with the cross frame 13 normally tending to hold the lever in an elevated position, the spring urged forward movement being limited by a stop 37 fixed upon one of the forward standards 12.

It will be apparent that the spring 36 should be strong enough to normally elevate the lever 32 against its stop thereby rocking the hollow link 31 through the intermediacy of the crank arm 30, and forcing the dipper down into the liquid. In other words, it is necessary that the spring 36 be sufficiently strong to successfully counteract the buoyance of the dipper and submerge it. To rock the filler apparatus to discharging position, it is merely necessary to step upon the treadle 35, moving the lever down against its lower stop 38, and thereby rocking the shaft 21 to lift the dipper out of the liquid and swing the spouts 29 to discharging position.

Unlike prior devices of this character, the pipes and their discharge spouts are so arranged that individual rows of receptacles, each row having receptacles spaced at different distances from the tank, may be simultaneously filled. A typical instance of this arrangement of the receptacles, is illustrated in dotted lines in Fig. 5, in which I have shown a mold 40 having a plurality of rows of pendant mold cavities 41 therein. In order to accomplish the desired registration of the discharge spouts with the cavities or receptacles to be filled, the pipes 26 are not at right angles to the bar 21 but are disposed in an angular relationship to the side walls of the tank, the pipes being arranged in sets, each set consisting of as many pipes as there are receptacles in a row to be filled, and the pipes of each set being of progressively increasing length, so their discharge spouts are disposed in a line at right angles to the axis of rotation of the rocker bar 21.

A level L is preferably affixed to the rear wall of the tank 10 to insure its correct emplacement and prevent inaccurate measurement such as would occur were the liquid deeper in one end of the dipper than in the other, due to the fact that the dipper was not maintained horizontal during its entire course of movement.

As is evident from Fig. 2, the inner ends of the pipes 26 become immersed in the liquid when the dipper is submerged. Means is therefore provided for preventing this liquid on the outside of the pipes from escaping beyond the rocker bar 21 and soiling the outside of the machine or the discharge ends of the pipes. This mechanism illustratively comprises a pair of annular flanges 21a, diverging from the two rear corners of the square rocker bar and defining a trough to entrap the liquid which may run down the outsides of the pipes as the dipper is elevated and return it to the tank.

The mold illustrated in Fig. 5, is of the character commonly employed in the manufacture of frozen confections and in this art, it is frequently desirable to use a mold of double width, that is, a mold having eight cavities to a transverse row. These larger sized molds offer a somewhat different problem in filling them, since to use enough pipes to fill eight molds simultaneously, would necessitate the pipes being of relatively small diameter and would slow up the filling process. Furthermore, the tilting construction might become cumbersome and difficult to balance.

I have therefore illustrated in Figs. 5, 6 and 7, a novel arrangement whereby the wide molds may be conveniently filled. Here it will be observed that two measuring and filling units are spaced apart and one of the large molds 40a is placed on a track or other support 49 between them. For convenient simultaneous operation of the dippers of the two filling units, the crank arms 30 are connected to the upper ends of links 50, said links at their lower ends, being connected to the ends of levers 51, these levers being fulcrumed on brackets 52, secured to a cross frame piece 53, connecting the standards of the two adjacent tanks. A pair of rollers 54 at the ends of the levers are engageable with a cam element 55 rotatable on a spindle 56 carried by a bracket 57 mounted on the cross bar 53, and operated by any suitable means, such for instance, as the handle 58. The coiled springs 59 which connect the levers 51 to the cross bar 53, tend to hold rollers 54 against the cam and consequently tend to urge the dippers into submerged position. As the cam is operated, however, its high side elevates the rollers, drawing the crank arms down and swinging the various funnels over the molds to be filled, where they discharge their liquid.

Another advantage of this type of construction is the fact that syrups of two different flavors may be dispensed from the tanks and in a single batch of confections, a variety of flavors may be obtained.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings, shall be interpreted as illustrative and not in a limiting sense.

Having thus described my invention, what I claim as new and desire to secure by Letters Patent is:—

1. In an apparatus for simultaneously filling a plurality of receptacles with measured quantities of liquid, a tank to contain the liquid, a tilting structure, a plurality of straight parallel pipes fixed intermediate their ends on the tilting structure, a delivery spout at the end of each pipe, a dipper communicating with the other ends of the pipes and through which said pipe ends are in communication with each other, said dipper being arranged for submersion in and emergence from the liquid of the tank by operation of said tilting structure, the amount of liquid delivered to the respective pipes by the dipper as the parts are moved to dipper discharging position being determined by the cross sectional area of said pipes.

2. In an apparatus of the class described a tank adapted to contain liquid, means to simultaneously deliver a plurality of measured quantities of liquid from the tank including a plurality of pipes, and a rockable member disposed above the liquid line in the tank and to which the intermediate portions of the pipes are secured, a dipper fixed to the inner ends of the pipes for submersion in the liquid as the pipes are tilted in one direction and discharge through the pipes as the latter are tilted in the opposite direction, said pipes at their delivery ends including downwardly turned discharge spouts, and open collars aligned with and above said spouts to permit free passage of a cleaning tool through the spouts in a direction substantially transverse to the axis of the pipes.

3. In an apparatus of the class described a tank adapted to contain liquid, means to simultaneously deliver a plurality of measured quantities of liquid from the tank including a plurality of straight pipes, and a rockable member disposed above the liquid line in the tank and to which the intermediate portions of the pipes are secured, a dipper fixed to the inner ends of the pipes for submersion in the liquid as the pipes are tilted in one direction and discharge through the pipes as the latter are tilted in the opposite direction, said pipes being arranged in parallel relationship and in sets, each set including a series of laterally contiguous pipes of progressively varying lengths, the discharge ends of the pipes of each set being aligned in a plane at right angles to the rocking axis.

4. In an apparatus of the class described a tank adapted to contain liquid, means to simultaneously deliver a plurality of measured quantities of liquid from the tank including a plurality of pipes, and a rockable member disposed above the liquid line in the tank and to which the intermediate portions of the pipes are secured, a dipper fixed to the inner ends of the pipes for submersion in the liquid as the pipes are tilted in one direction and discharge through the pipes as the latter are tilted in the opposite direction, said pipes being arranged in parallel relationship and in sets, each set including a series of straight pipes of progressively varying lengths and the axes of the pipes being disposed at such an angle to the rocking axis that the discharge ends of the pipes of each set are arranged in a row at right angles to such axis.

5. As a new element in a liquid measuring and filling apparatus, a dipping and pouring unit adapted to be tiltably mounted in operative relation to a supply tank, said unit including a dipper, a hollow stem connected at one end to the dipper and a funnel disposed at right angles to the stem and communicating at its intermediate portion therewith.

6. In a machine of the class described a tank and means to supply liquid thereto, a rocker bar arranged adjacent the wall of the tank above the liquid level therein, a plurality of pipes, the intermediate portions of which are fixed with respect to the bar, a dipper in the tank connected to the inner ends of the pipes, delivery spouts at the outer ends of the pipes and means to actuate the rocker bar, including a spring normally tending to turn the bar and of sufficient strength to overcome the buoyancy of the dipper and submerge the latter.

7. In a machine of the class described a tank and means to supply liquid thereto, a rocker bar arranged adjacent the wall of the tank above the liquid level therein, a plurality of pipes, the intermediate portions of which are fixed with respect to the bar, a dipper in the tank connected to the inner ends of the pipes, delivery spouts at the outer ends of the pipes and means to actuate the rocker bar, including a crank arm fixed to the bar, a treadle lever, and a link connecting the free ends of the arm and lever.

8. In a machine of the class described a tank and means to supply liquid thereto, a rocker bar arranged adjacent the wall of the tank above the liquid level therein, a plurality of pipes, the intermediate portions of which are fixed with respect to the bar, a dipper in the tank connected to the inner ends of the pipes, delivery spouts at the outer ends of the pipes and means to actuate the rocker bar, including a crank arm fixed to the bar, a treadle lever, and a link connecting the free ends of the arm and lever, and a spring normally tending to elevate the lever and thereby depress the dipper.

9. In a machine of the class described a tank and means to supply liquid thereto, a rocker bar arranged adjacent the wall of the tank above the liquid level therein, a plurality of pipes, the intermediate portions of which are fixed with respect to the bar, a dipper in the tank connected to the inner ends of the pipes, delivery spouts at the outer ends of the pipes and means to actuate the rocker bar, including a crank arm fixed to the bar, a treadle lever, and a link connecting the free ends of the arm and lever, and a spring normally tending to elevate the lever and thereby depress the dipper, and stop means limiting the range of movement of the lever in both directions.

10. An apparatus for delivering measured quantities of liquid simultaneously to a plurality of receptacles, including a supply tank, a plurality of straight parallel pipes for delivering the liquid, said pipes being fixed with respect to each other and mounted to tilt about a common axis arranged in non-right-angular relationship to the axes of the pipes.

11. An apparatus for delivering measured quantities of liquid simultaneously to a plurality of receptacles, including a supply tank, a plurality of straight parallel pipes for delivering the liquid, said pipes being fixed with respect to each other and mounted to tilt about a common axis arranged in non-right-angular relationship to the axes of the pipes, the discharge ends of the pipes being disposed in a row at right angles to the tilting axis.

12. An apparatus for delivering measured quantities of liquid simultaneously to a plurality of receptacles, including a supply tank, a plurality of straight parallel laterally contiguous pipes for delivering the liquid, said pipes being fixed with respect to each other and mounted to tilt about a common axis arranged in non-right-angular relationship to the axes of the pipes, the discharge ends of the pipes being disposed in a row at right angles to the tilting axis, and the receiving ends of the pipes being connected to a common, horizontally disposed dipper member adapted for submersion in and emergence from the tank.

13. In a machine of the class described, a tank and means to supply liquid thereto, a rocker bar arranged adjacent the wall of the tank above the liquid level therein, a plurality of pipes, the intermediate portions of which are fixed with respect to the bar, a dipper in the tank connected to the inner ends of the pipes and means associated with the rocker bar to entrap liquid draining along the outsides of the pipes and prevent its escape from the tank.

14. In a machine of the class described, a tank and means to supply liquid thereto, a rocker bar arranged adjacent the wall of the tank above the liquid level therein, a plurality of pipes, the intermediate portions of which are fixed with respect to the bar, a dipper in the tank connected to the inner ends of the pipes and means associated with the rocker bar to entrap liquid draining along the outsides of the pipes and prevent its escape from the tank, said means including a guard structure carried by the rocker bar to receive such liquid and return it to the tank.

15. In apparatus of the class described, a pair of spaced tanks and a support between them adapted to receive a transverse row of receptacles to be filled, means associated with each tank for delivering simultaneously to the nearest receptacles of such row, measured quantities of liquid, and a common actuating means for said liquid delivery means, the liquid delivery means of each tank including a dipper, a plurality of pipes leading from the dipper, and delivery spouts at the ends of the pipes disposed at different distances from the tank and means for rockably mounting the pipe and dipper assemblage.

16. In apparatus of the class described, a pair of spaced tanks and a support between them adapted to receive a transverse row of receptacles to be filled, means associated with each tank for delivering simultaneously to the nearest receptacles of such row, measured quantities of liquid, and a common actuating means for said liquid delivery means, the liquid delivery means of each tank including a dipper, a plurality of pipes leading from the dipper, and delivery spouts at the ends of the pipes disposed at different distances from the tank and means for rockably mounting the pipe and dipper assemblage, the actuating means including pairs of levers to control rocking movement of the dipper and a common cam acting on both of said levers.

17. In apparatus of the class described, a pair of spaced tanks and a support between them adapted to receive a transverse row of receptacles to be filled, means associated with each tank for delivering simultaneously to the nearest receptacles of such row, measured quantities of liquid, and a common actuating means for said liquid delivery means, the liquid delivery means of each tank including a dipper, a plurality of pipes leading from the dipper, and delivery spouts at the ends of the pipes disposed at different distances from the tank and means for rockably mounting the pipe and dipper assemblage, the actuating means including pairs of levers to control rocking movement of the dipper and a common cam acting on both of said levers, said cam acting to swing the delivery ends of the pipes over the receptacles and spring means normally tending to submerge the dippers in the liquid and to hold the levers against the cam.

MILTON SCHNAIER.